Jan. 2, 1951            J. C. GODSHALL            2,536,275

VALVE

Filed Aug. 31, 1944                                        4 Sheets-Sheet 1

INVENTOR
JOHN C. GODSHALL
BY HIS ATTORNEYS
Barr, Borden & Fox

Jan. 2, 1951   J. C. GODSHALL   2,536,275
VALVE
Filed Aug. 31, 1944   4 Sheets-Sheet 2
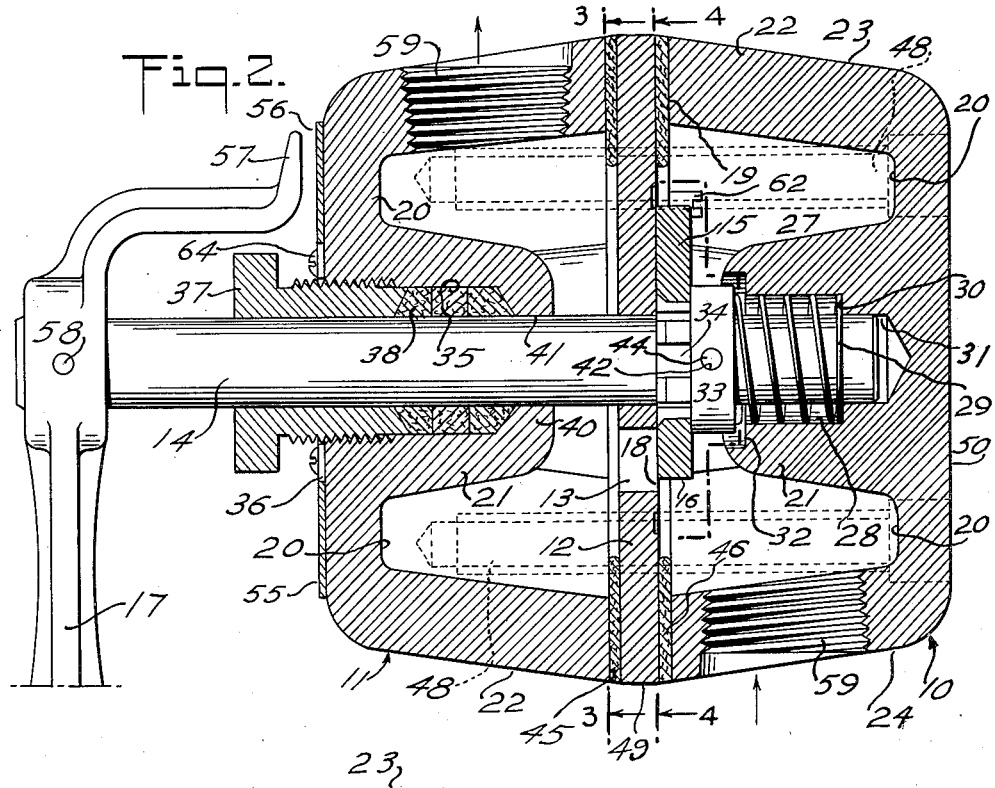
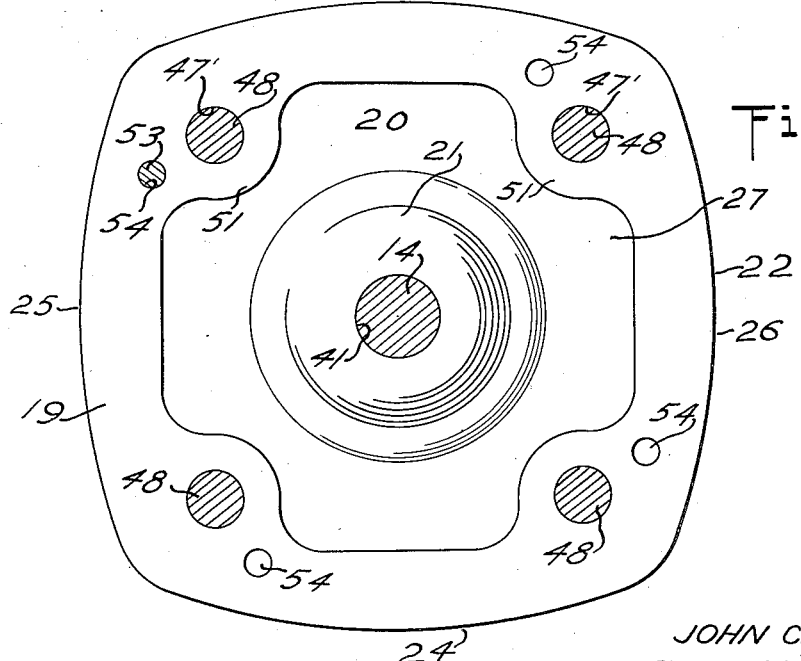
INVENTOR
JOHN C. GODSHALL
BY HIS ATTORNEYS
Barr, Borden & Fox

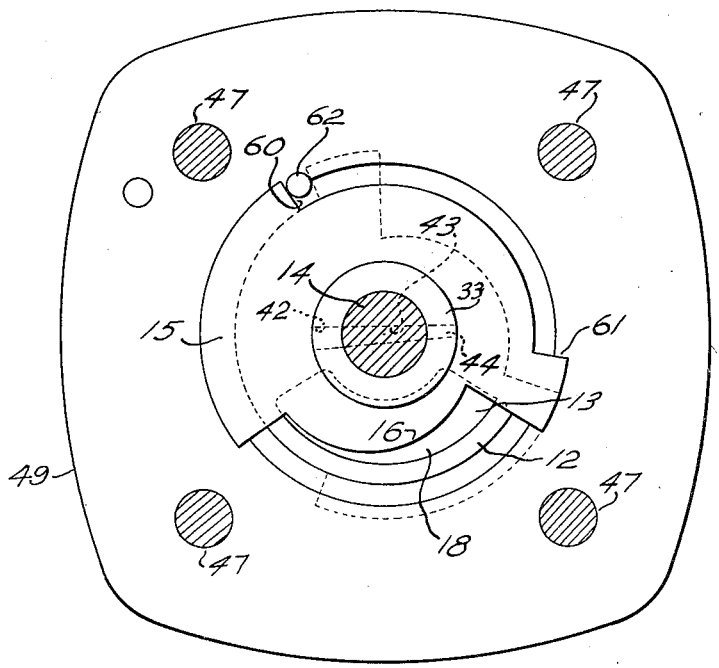
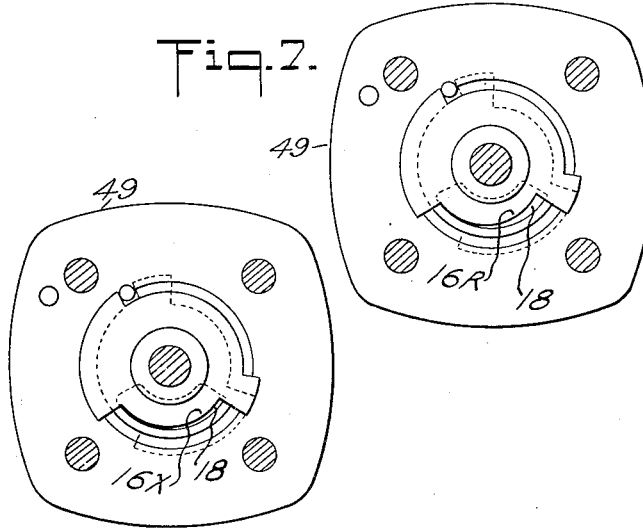
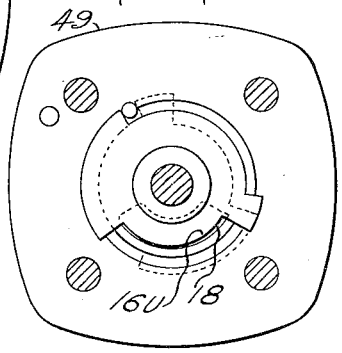

Jan. 2, 1951   J. C. GODSHALL   2,536,275
VALVE
Filed Aug. 31, 1944   4 Sheets-Sheet 4

INVENTOR
JOHN C. GODSHALL
BY HIS ATTORNEYS
Barr, Borden & Fox

Patented Jan. 2, 1951

2,536,275

UNITED STATES PATENT OFFICE 2,536,275

VALVE

John C. Godshall, Roslyn, Pa., assignor to Automatic Temperature Control Co., Inc., Philadelphia, Pa., a corporation of Pennsylvania Application August 31, 1944, Serial No. 552,084

3 Claims. (Cl. 251—86)

This invention relates to valves and particularly to oscillatable disc valves for fluids.

As such valves have been developed hitherto they have been possessed to numerous disadvantages, which include, among others, high costs, susceptibility to leakage, requirements of great numbers of valves and parts of various sizes to take care of various size requirements, and inflexibility of disposition of the intake and discharge conduits. The factors of high cost have included the necessity for large numbers of different patterns and large numbers of individual castings, heavy machining costs, and the requirement for providing an entirely new valve when a different rate of feed or supply or different capacity was desired for an initial given valve situation.

It is among the objects of this invention: to overcome the disadvantages of the prior art; to provide a valve housing comprised of a pair of identical and complemental castings; to provide a valve arranged to permit any desired combination of locations of intake and discharge openings to accord with required angles of intake and discharge conduits relative to the valve body; to sharply reduce the costs of valves; to reduce the machining operations necessary for valves; to provide a valve with readily interchangeable cut-off discs from which a desired selected maximum through passage or opening and different rates of varying control thereof can be obtained; to provide a shaft for a valve with a stuffing box which, despite pressure in the intake side of the valve, is saved from any but the back pressure in the valve; to provide a valve with a disc and seat arranged to be forced into lateral sealing engagement by the pressure of the fluid being controlled; to provide a valve of neatness and compactness; to provide a valve by which the inventory necessary to take care of various standard requirements can be sharply reduced; to provide a single seated valve with no line pressure on the stuffing box thereof; to provide a simplified valve gang; to provide a combined power and manual operated valve; to provide a power operated valve for operation between limits, with manual means for changing the limits; to provide a metering valve for controlling the flow of any fluids including liquids and gases. Other objects and advantages will become more apparent as the description proceeds.

In the accompanying drawings forming part of this description:

Fig. 2 represents a transverse vertical section through the valve of Fig. 1.

Fig. 3 represents a lateral vertical section through the valve taken on line 3—3 of Fig. 2.

Fig. 4 represents a lateral vertical section through the valve on line 4—4 of Fig. 2.

Fig. 7 represents a lateral section through the valve showing the flow relation of one rotatable disc of known predetermined profile and capacity to the fixed port of the relatively fixed seat to secure one predetermined rate of flow change as well as a maximum flow, alternate to that of Fig. 4.

Figs. 8 and 9 respectively represent similar sections to that of Fig. 7, showing the flow relation of different rotatable discs forming alternate replacements for that of Fig. 4, with the fixed port opening of the relatively fixed seat to establish different rates of flow change and different maximums therethrough.

Figure 10:
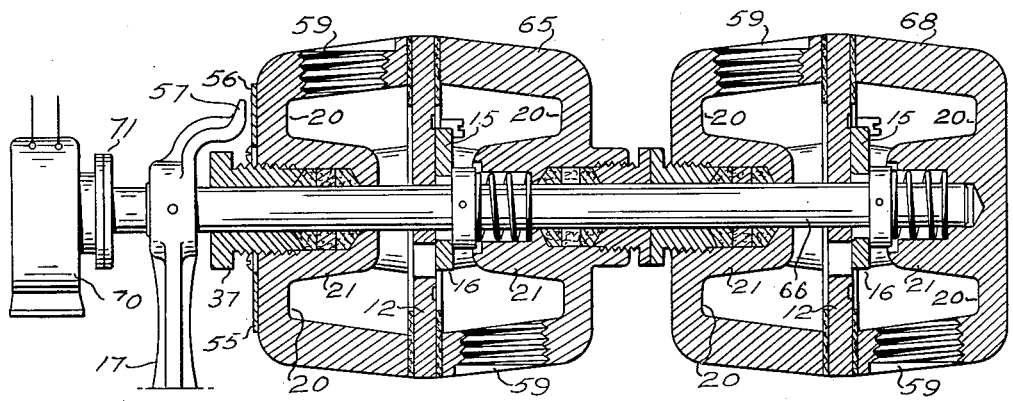

Fig. 10 represents an illustrative section of a pair of valves assembled in a gang, with a power unit for moving the common shaft, and with manual means for controlling the shaft position as well.

Figure 11:
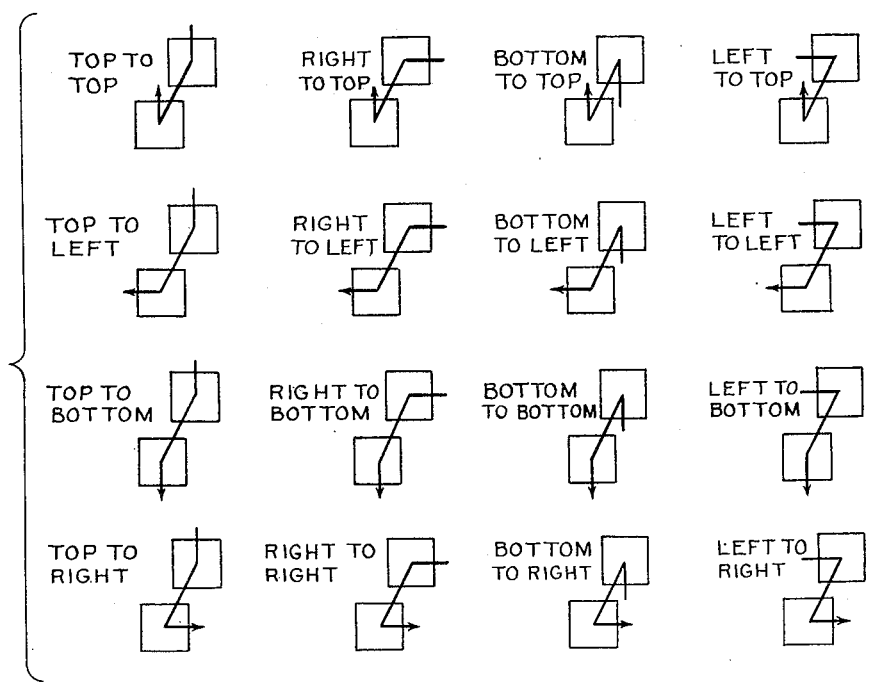

Fig. 11 represents a series of diagrammatic illustrations of the relative directions of inflow and outflow of fluid passing through the valve in the sixteen different combinations available from the illustrative eight-faceted complete valve of this invention.

Referring now to Fig. 2 there is disclosed a valve comprised, preferably, of a rear intake half or compartment 10, a front outlet or discharge half or compartment 11, and an adjustable but relatively fixed seat 12 comprising a substantially planar disc having the generally arcuately extending radially narrow port 13, with the seat 12 gripped between the front and rear halves or compartments of the valve. The preferred valve also includes the shaft 14 and the rotatable disc 15 anchored thereto and having the eccentrically arcuate or flattened helical cut-off edge 16 and arranged to abut tightly transversely of the valve upon the seat 12 and by manipulations of a handle 17 or the like on shaft 14 to establish, modify, disrupt and close a through passage 18 through the port 13 and past the edge 16. By means such as the handle 17 noted, or by gearing or the like if power actuation is desired, the shaft 14 can be turned and through passage 18 closed and sealed or, with operation in the proper direction and to the proper degree, the transverse channel 18 past the edge 16 of disc 15 and through the port 13 permits a gradually increasing and finally a predetermined maximum flow into the front or discharge half or compartment 11 of the valve. The actual shape and area of the transverse channel 18 will be governed by the relation of the arcuate edge 16 to the outline of port 13, and it is thus a function of the degree of eccentricity of edge 16 to the axis of the arcuate port 13, and as shown in Figs. 7, 8 and 9, the full open through passage 18 varies with the profile of the replacement disc with the respective cutoff edges 16, designated in those three figures respectively as 16R, 16U, and 16X, indicating the respective capacities of the variable disc and fixed seat combinations. It will be explained later but should be understood at this point, that the valve according to the preferred form is arranged to be disassembled for purposes of changing one of the discs for another, whereby the capacity of the valve can be selected and predetermined or changed.

Returning to Fig. 2, it will be observed from the remaining points of similarity that the rear compartment half 10 and the front compartment half 11 were initially identical castings or forgings, each comprising a lateral wall 20, a concentric axial protuberance 21 extending toward the open end transversely away from the wall 20 with which it is integral, and having a continuous peripheral axial flange wall 22 terminating in a planar surface 19 parallel to wall 20. The wall 22, while being permissably cylindrical or even generally conical, if desired, is preferably generally roundedly rectangular or polyangular, and tapering as shown in Figs. 2 and 3, and is provided with lateral slightly arcuate tapering faces or facets which for convenience may be designated respectively as a top surface 23 and a bottom surface 24, with side faces 25 and 26 respectively between them when the preferred four surfaces are used in place of a different number. The axial protuberance 21, side wall 22, and lateral wall 20 between them define a generally flaring chamber 27 enlarging from the closed end toward the open end surface 19. It will be seen that although the castings or forgings 10 and 11 are initially identical and without holes, the rear compartment member or half 10 has the axial protuberance 21 drilled from its peak end only to form a spring-receiving axial recess 28 having a shoulder 30 containing spring 29, and the recess leads to a reduced bore 31 to receive the end of the shaft 14 as the parts are assembled. At the open end of axial recess 28 it is preferred to form an enlarged clearance recess 32, within which the hub 33 of a bushing 34 of the rotatable disc, to be described, is received. The complemental front valve half or compartment 11 is drilled differently and has an axial bore 35 formed in the protuberance from the outer surface 36 of the wall 20 thereof, which is threaded to receive the nut 37 and the packing material 38 of a packing gland forming a stuffing box for the shaft. The web 40 at the inner end of the drilled protuberance 21 is internally cooperatingly shaped so as to contribute to the efficacy of the packing about the shaft 14, which passes through an axial bore 41 to receive the latter. Obviously, and as shown in Fig. 10, the rear half may also be pulled through to receive a stuffing box with the shaft extending completely through the valve when "gang" operation is desired. In this case, two front halves are assembled as a unit for the first and each additional intermediate valve of a gang, or an additional rear half, provided with an external boss to receive a stuffing box, is provided as shown in Fig. 10 for assembly with a standard front half portion.

Each rotatable disc is preferably provided, as noted, with a bushing 34 having the flange or hub 33, and the bushing is arranged to slide on shaft 14, and is preferably stake-riveted to the disc 15. Each flange or hub 33 is initially drilled transversely as at 42, when furnished by the manufacturer, so as to be taper-reamed with the registering transverse hole 43 in the shaft 14, so as to receive a taper pin 44 to anchor the shaft 14 rigidly to the disc 15.

Figure 6:
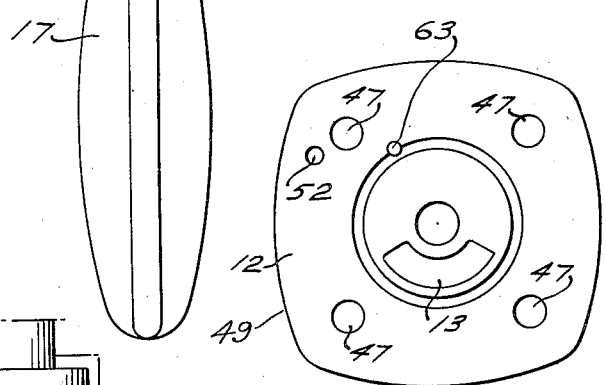
Fig. 6 represents an elevation of the adjustably positionable but relatively fixed port-carrying seat or seat-disc of the valve.
Figure 5:
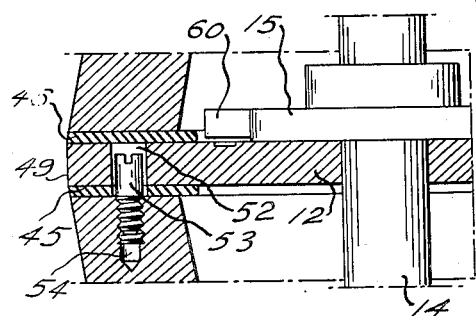
Fig. 5 represents a fragmentary transverse substantially horizontal section through the valve on line 5—5 of Fig. 1.

It is preferred to assemble the valve components so that the seat 12, one surface of which is machine finished and ground, is between a pair of gaskets, respectively 45 and 46, and it is provided with preferably four transverse apertures, as 47, in the general corners of the disc or seat, in position to be engaged by the preferably four anchoring screws 48 passing from the rear face 50 of the wall 20 of the rear complemental half portion or compartment 10, in suitable apertures 47' in enlarged corner portions 51 of the castings. Additionally, the seat 12, as shown in Fig. 6, has a single registration opening 52 by which the seat 12 can be properly registered with its rounded rectangular peripheral edge surface 49 registering with and forming aligned continuations of the respective side wall surfaces 23, 24, 25 and 26 of the front half 11 of the valve as the valve is assembled. This registration is by means of a threaded pin 53 selectively mounted in one of the four identical threaded apertures 54 in the meeting face 19 thereof. It will be understood that the seat 12 can be assembled in any one of four angular dispositions relative to the front portion 11, as determined by the location of the pin in its selected aperture 54. The rear compartment is also registered with the disc seat 12 so that its facets align with the appropriate portions of the edge 49 thereof.

One of the problems of the prior art has been to provide enough valves to take account of the various sizes of pipes and conduits with which they may be associated. This has required a large inventory, which is inefficient and expensive. In the interest of effecting a reduction in inventory, it is preferred to provide that each side wall 23, 24, 25 and 26 is of such axial extent and is of such circumferential extent between internally enlarged corners, as to enable the drilling and tapping of at least one of four different sized apertures such, illustratively, as shown at 59, to enable the valve, for instance, to receive pipes selected from those of one-quarter of an inch to three-quarters of an inch with the same identical valve in one illustrative size of valve, although in still further and more sharply reducing inventory it is further preferred to drill and tap holes of two sizes only within this range. Thus, one size of hole will be one-half of an inch, which by the use of a proper threaded adapter can take care of one-quarter of an inch requirements, and the other size hole will be three-quarters of an inch, with which a proper threaded adapter can be associated so as to take care of three-eighths of an inch requirement. It is pointed out that the general flatness or slight curvature of the respective facets or wall faces conduces toward drilling the desired apertures where a cylinder or cone might render it very difficult. With identical castings and only two sizes of drilled apertures, it will be seen that a minimum number of parts need be carried to take care of a multiplicity of different requirements.

The front wall 36 of the front compartment 11 receives a flattened dial or indicator disc 55 bearing proper indicia such as shown at 56, to be swept by the pointer extension 57 of the handle 17. Preferably, the handle 17 is mounted on the shaft 14 by a taper pin device 58. Dial 55 may also be mounted in any selected one angular disposition relative to compartment 11 by screws 64.

In order to limit the movement of the handle and its associated disc 15, the latter is preferably provided with a pair of radially extending stops, respectively 60 and 61, arranged alternately to engage and abut a pin 62 mounted in an aperture 63 of the seat 12.

Figure 1:
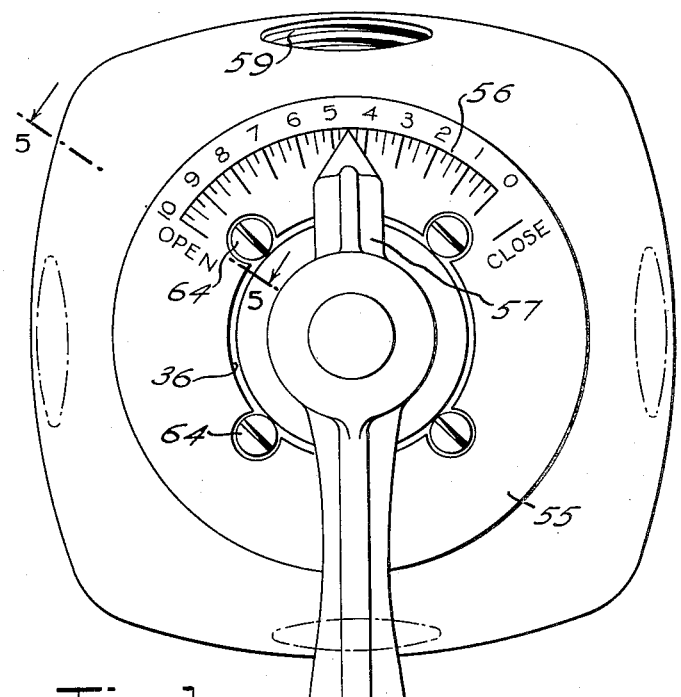
Fig. 1 represents a front elevation of the valve according to a preferred form of the invention from the front or operating face thereof, showing a threaded opening for an outlet conduit at the top of the valve and indicating in dotted lines alternate positions which the threaded opening may occupy to permit a discharge conduit to enter through the sides or bottom of the valve.

Let it be assumed that a valve as shown in Figs. 1 and 2 is delivered to a user, who finds, for instance, that his pipe or conduit disposition is or should be such that, illustratively only, for instance, the intake pipe should enter from the top instead of from the bottom as shown, whereas the discharge conduit in place of entering the top as shown should enter from the left side, again for purely illustrative example. The procedure would be as follows: He would remove the tapered pin 58 and remove the handle. He would loosen the screws 64 and remove the dial 55. He would then remove the screws 48 and separate the valve portions. He would then remove the pin 53 from the particular hole it was in and move it to the next opening counter-clockwise of the face 19, so that even though the threaded opening 59 will now be in the left side instead of the top, the handle is still to be disposed vertically with the dial at the top. He would then reassemble the parts, making sure that the rear half 10 was turned 180° from its initial position, while the front half 11 was turned 90° counter-clockwise from its initial position. Thereafter, he would turn the dial 90° clockwise from its initial position on the face 36. Thereafter, the handle 17 would be replaced. If it were also, or in the alternative, desired to replace a disc of one capacity for a disc of another capacity, of which those shown in Figs. 4, 7, 8 and 9 are purely illustrative and not limitative, this would be done the same way, in the way of disassembly, the tapered pin 44 would be driven out and the disc 15 would be removed from the shaft. The new disc 15 would then be placed on the shaft 14, the registering holes taper-reamed, and the tapered pin driven in again and the parts reassembled. It is to be understood that the face of disc 15 juxtaposed to seat 12 is machined and ground.

Referring to Fig. 10 a first valve 65 is provided, so arranged as to have shaft 66 pass completely through it, either to connect with a flexible coupling at one end (not shown) with the latter in turn connected to a shaft of a second valve 68, or the shaft 66 extends completely through the first valve and into the second. A manual control lever 17 is provided to swing shaft 66 with reference to a dial 55. A controlled reversible power unit 70 with adjustable limit switches drives shaft 66 through a lost motion or friction clutch 71 and it will be clear that motor 70 can swing the gang of valves through their entire cycle from closed to open, or through a restricted portion thereof, between limits set manually by adjustments of the control lever 17 against the friction of clutch 71. The control lever 17 can also be used to exert a complete manual emergency control as well.

The universality of the valve, and the few number of parts necessary to form it, the ease of machining the only surfaces which require it and the utility of the valve will be apparent. It is pointed out that with the valve closed, the pressure of the fluid entering the intake half is directed against the disc 15 assisting the compression spring 29 to force the disc against the seat to seal same. At the same time, there is no pressure in the discharge side so that there is normally but small chance of leakage from the stuffing box.

It is an important feature of the invention that although the complemental portions are arranged to be castings, they are provided with such degrees of angularity and draw as to be susceptible to formation by drop forgings and such construction is contemplated.

Having thus described my invention, I claim:

1. A valve comprising a first and a second substantially identical casting or forging, each casting comprising a wall and a solid axial protuberance merging into the wall on one side thereof and a peripheral flange merging into the said wall on the same side thereof as the protuberance but in spaced relation thereto to form a fluid compartment space, the first casting having an axial recess formed in the tip end of the axial protuberance to receive a shaft and the second casting having an axial recess formed in the wall end of its axial protuberance to receive a shaft and a stuffing box, a valve seat having a port and disposed between the free ends of the respective flanges of the castings, a shaft extending through the second casting, the valve seat, and into the axial recess of the first casting, and a valve disc mounted on the shaft between the seat and the first casting in juxtaposition to the seat in a position to cover and uncover the port in the seat to control the flow through the valve.

2. A valve comprising a first and a second substantially identical casting or forging, each casting comprising a wall and a solid axial protuberance merging into the wall on one side thereof and a peripheral flange merging into the said wall on the same side thereof as the protuberance but in spaced relation thereto to form a fluid compartment space, the first casting having an axial recess formed in the tip end of the axial protuberance to receive a shaft and the second casting having an axial recess formed in the wall end of its axial protuberance to receive a shaft and a stuffing box, a valve seat having a port and disposed between the free ends of the respective flanges of the castings, a shaft extending through the second casting, the valve seat, and into the axial recess of the first casting, a valve disc mounted on the shaft between the seat and the first casting in juxtaposition to the seat in a position to cover and uncover the port in the seat to control the flow through the valve, and a spring device in the axial recess of the protuberance of the first casting compressed between the recess and the disc to force the latter laterally into sealing engagement with the seat.

3. A valve comprising a first and a second substantially identical casting or forging, each casting comprising a wall and a solid axial protuberance merging into the wall on one side thereof and a peripheral flange merging into the said wall on the same side thereof as the protuberance but in spaced relation thereto to form a fluid compartment space, the first casting having an axial recess formed in the tip end of the axial protuberance to receive a shaft and the second casting having an axial recess formed in the wall end of its axial protuberance to receive a shaft and a stuffing box, a valve seat having a port and disposed between the free ends of the respective flanges of the castings, a shaft extending through the second casting, the valve seat, and into the axial recess of the first casting, a valve disc mounted on the shaft between the seat and the first casting in juxtaposition to the seat in a position to cover and uncover the port in the seat to control the flow through the valve, a handle on the shaft, a dial on the second casting in position to be juxtaposed to a portion of the handle to indicate the relative position of the disc and port opening.

JOHN C. GODSHALL.

REFERENCES CITED

The following references are of record in the file of this patent:

UNITED STATES PATENTS

| Number | Name | Date |
|---|---|---|
| 193,087 | Holly | July 17, 1877 |
| 357,561 | Rohney | Feb. 8, 1887 |
| 844,255 | Cramer | Feb. 12, 1907 |
| 1,259,054 | Stewart | Mar. 12, 1918 |
| 1,270,722 | Gillette | June 25, 1918 |
| 1,615,462 | Lorraine | Jan. 25, 1927 |
| 1,751,591 | McCloskey | Mar. 25, 1930 |
| 1,856,825 | Alphonso | May 3, 1932 |
| 1,990,423 | Bohnenblust | Feb. 5, 1935 |
| 2,080,272 | Hollman | May 11, 1937 |
| 2,105,198 | McNamara | Jan. 11, 1938 |
| 2,219,119 | Schumann | Oct. 22, 1940 |
| 2,279,066 | Sears | Apr. 7, 1942 |
| 2,290,783 | Turpin | July 21, 1942 |
| 2,301,976 | Schellins | Nov. 17, 1942 |
| 2,305,941 | Wantz | Dec. 22, 1942 |

FOREIGN PATENTS

| Number | Country | Date |
|---|---|---|
| 18,483 | Great Britain | Oct. 27, 1891 |
| 60,462 | Norway | Feb. 13, 1939 |
| 434,796 | Great Britain | Dec. 6, 1933 |